UNITED STATES PATENT OFFICE.

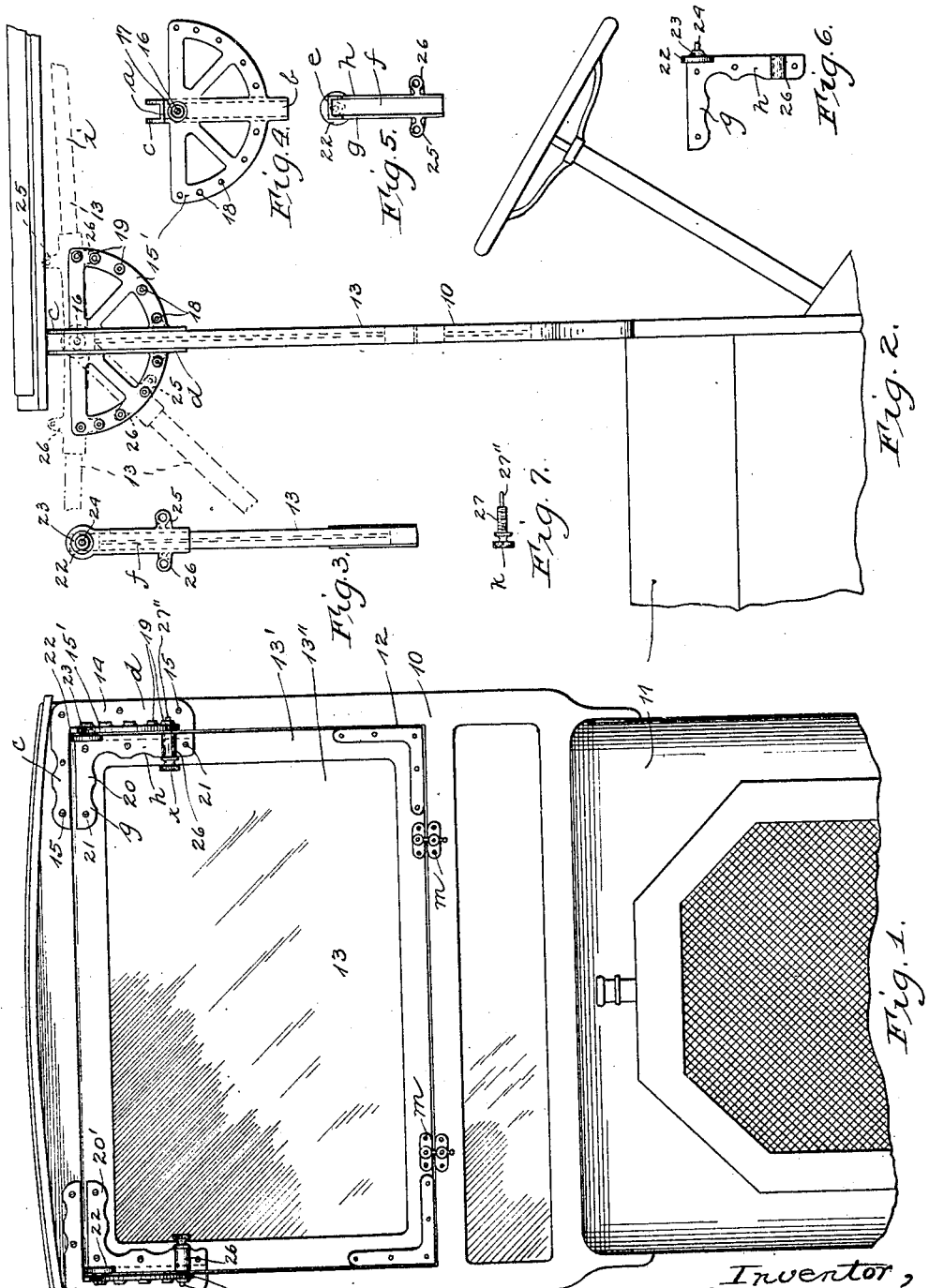

MYER D. MAREMONT, OF CHICAGO, ILLINOIS.

WIND-SHIELD.

1,085,281.  Specification of Letters Patent.  Patented Jan. 27, 1914.

Application filed January 30, 1913. Serial No. 745,055.

*To all whom it may concern:*

Be it known that I, MYER D. MAREMONT, a citizen of the United States, residing at Chicago, county of Cook, and State of Illinois, have invented a new and useful Improvement in Wind-Shields, of which the following is a specification.

My invention relates to wind shields, particularly to such shields for motor vehicles. Among the important objects of the invention are to provide a shield trunnioned at its upper ends to the upper ends of the side walls of the vehicle front opening; to provide simple and improved male and female trunnion fittings which are strong but neat and ornamental: to provide a strengthening hub for the trunnion pin and a pocket for receiving such hub so that the pin is relieved of all excess strain; to provide improved means in the form of a segment on one fitting and a locking pin on the other fitting for securing the shield in any angular adjustment either within or without the vehicle; to provide an inner and outer barrel for the pin on each fitting so that adjustment and locking can be made more readily; to provide a threaded locking pin so that the locking can be made more secure and the shield prevented from rattling or becoming noisy; and in general to provide more simple and efficient construction and arrangement.

The various features of the invention are clearly illustrated in the accompanying drawings in which, Figure 1 is a front elevational view of the upper part of a vehicle front showing the windshield in place, Fig. 2 is a side elevational view of the parts shown in Fig. 1, Fig. 3 is a side view of the shield showing the pin trunnion fitting thereon, Fig. 4 is an inside view of the socket trunnion fitting, Fig. 5 is an inside view of the pin trunnion fitting, Fig. 6 is a front view of the pin trunnion fitting, and Fig. 7 shows the locking pin.

The front 10 of the vehicle 11 has the opening 12 for which the shield 13 is provided, this shield comprising the frame 13' and the glass plate 13''. L-shaped trunnion fittings 14 and 14' are secured to front 10 at the upper corners of the opening 12. The body parts $a$ and $b$ of the fittings are flushed into the upper and side walls respectively of the opening and have the flanges $c$ and $d$ between which these walls are received, screws 15 passing through the flanges serving to secure the fittings in place. Each fitting has a semicircular segment 15' forming an extension to the body part $b$ and centered near the bend of the fitting, the trunnion pin hole 16 being at this center and surrounded by the trunnion pocket 17. The segment may be of skeleton form as shown and adjacent its circular edge holes 18 are provided at intervals, a lug 19 surrounding each hole to give greater bearing surface for the locking pin which will be referred to later. The trunnion pin fittings 20 and 20' are also of L-shape and engage the upper corners of the shield. Each such fitting has the body parts $e$ and $f$ flushed into the frame 13' and flanges $g$ and $h$ receive the frame, screws 21 holding the fittings in place. The body part $f$ of each fitting has at its upper end the circular enlargement 22 from which extends a trunnion hub 23 and trunnion pin 24. The trunnion hubs and pins engage in the pockets and holes of the stationary fittings 14 and 14', the hubs greatly strengthening the pins and relieving them of most of the strain.

Extending laterally and in opposite directions from the lower end of the body part $f$ of each of the fittings 20 and 20' are lugs or barrels 25 and 26 which are threaded to receive the shanks 27' of locking pins 27. The inner ends 27'' of the pins are of reduced diameter for entering any of the holes 18 in the segments 15' to thus lock the shield in correspondingly angular position relative to the front 10 of the vehicle. A knurled head $k$ is provided for each pin. As the shanks of the pins are threaded they can be forced against the segments to hold the shield rigid and to prevent rattling thereof and noise when the vehicle is running.

Fig. 2 shows the shield in various angular adjustments and illustrates the utility of a locking pin barrel at either side of each shield trunnion fitting. If the shield is swung into the vehicle and against the top thereof as illustrated at $i$, it would be impossible to manipulate the locking pins if barrels were provided only on the inner sides of the fittings, and if the shields were swung to the outside of the vehicle it would be difficult and almost impossible to manipulate the pins from inside of the vehicle if barrels were provided only on the outsides of the fittings. However, by having both an inner and an outer barrel on each fitting the pins could readily be adjusted from within the vehicle whether the shield be swung in or out. When the shield is at or near vertical position or is swung out the pins are inserted in the inner barrels, and when the shield is swung toward horizontal into the vehicle the pins are inserted in the outer barrels. The driver need, therefore never leave the vehicle to adjust the shield. The locking of the shield in any position being positive by means of the threaded pins, such locking will firmly hold the shield and this is an improvement over such shields in which friction is solely depended upon to hold the shield in adjusted position. Such shields are apt to rattle and become noisy. Where the shield is trunnioned at its upper ends, as shown, different weather conditions can be more readily met. In rainy weather the shield may be set to act as an awning to keep out the rain, while at the same time the driver has a clear and unobstructed view ahead.

In order to more securely lock the shield when it is closed, suitable latches $m$ may be provided and so constructed that they may be quickly manipulated to release the shield.

The various fittings are of simple design and can be readily cast from suitable metal.

As changes and modifications are possible I do not desire to be limited to the exact structure and arrangement shown.

I claim the following:

1. In windshield adjusting mechanism the combination of an L shaped fitting having a pivot pin extending from its corner and lugs extending from opposite sides of one limb thereof, a companion fitting having a pivot opening for said pivot pin and having a sector provided with adjusting holes, and a locking screw adapted to thread through either lug to engage in one of said sector holes.

2. In windshield adjusting mechanism the combination of an L shaped fitting having side flanges, a pivot pin extending from the corner of said fitting, lugs on the opposite flanges of one limb of the fitting, a companion fitting having a hole for said pin and having a sector provided with a series of holes, and a threaded screw for threading through either lug to extend into one of said sector holes.

In testimony whereof I have signed my name to this specification in the presence of two subscribing witnesses this 28th day of January, A. D. 1913, at Chicago, Illinois.

MYER D. MAREMONT.

Witnesses:
BENJAMIN S. MESIROW,
EDW. R. NEUMANN.